(12) United States Patent
Pattok

(10) Patent No.: US 7,677,126 B2
(45) Date of Patent: Mar. 16, 2010

(54) BALL SCREW MECHANISM

(75) Inventor: Eric D. Pattok, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1175 days.

(21) Appl. No.: 11/258,500

(22) Filed: Oct. 25, 2005

(65) Prior Publication Data

US 2006/0213296 A1   Sep. 28, 2006

Related U.S. Application Data

(60) Provisional application No. 60/663,987, filed on Mar. 22, 2005.

(51) Int. Cl.
*F16H 1/24* (2006.01)
*F16H 55/02* (2006.01)

(52) U.S. Cl. ............... 74/424.86; 74/424.87; 74/424.82

(58) Field of Classification Search ............... 74/424.71, 74/424.81, 424.82, 424.86, 424.87
See application file for complete search history.

(56) References Cited

U.S. PATENT DOCUMENTS

| | | | |
|---|---|---|---|
| 2,159,225 A | 5/1939 | Phelps et al. |
| 2,298,011 A | 10/1942 | Hoffar |
| 2,455,368 A | 12/1948 | Hoffar |
| 2,502,066 A | 3/1950 | Tanner |
| 2,618,166 A | 11/1952 | Douglas |
| 2,714,821 A | 8/1955 | Orner |
| 2,851,897 A | 9/1958 | Cochrane |
| 2,855,790 A | 10/1958 | Smith |
| 2,891,414 A | 6/1959 | Gillum |
| 2,895,343 A | 7/1959 | Orner |
| 2,995,948 A | 8/1961 | Galonska et al. |
| 3,081,644 A | 3/1963 | Hudgens et al. |
| 3,170,336 A | 2/1965 | Bohnhoff |
| 3,327,551 A | 6/1967 | Prueter |
| 3,421,383 A | 1/1969 | Smith et al. |
| 3,512,426 A | 5/1970 | Dabringhaus |
| 3,580,098 A | 5/1971 | Goad |
| 3,667,311 A | 6/1972 | Wysong |
| 3,668,940 A | 6/1972 | Avena et al. |
| 3,791,232 A | 2/1974 | Helmer |
| 3,815,435 A | 6/1974 | Eschenbacher et al. |

(Continued)

*Primary Examiner*—Thomas R Hannon
*Assistant Examiner*—Justin Krause
(74) *Attorney, Agent, or Firm*—Cantor Colburn LLP

(57) ABSTRACT

A ball screw mechanism including a screw having a first axis and at least one screw groove extending along a first helical path about the first axis, and a nut having a first aperture receiving the screw. The nut also includes at least one nut groove extending along a second helical path about the first axis between first and second edges disposed on opposite sides of the screw. The at least one screw groove and the at least one nut groove are aligned and cooperate to form a helical passageway extending at least 180 degrees about the first axis between a first opening at the first edge and a second opening at the second edge. The ball screw mechanism also includes a plurality of balls moving, in part, along the helical passageway. The ball screw mechanism also includes an external ball nut return radially spaced from the screw extending at least partially around the nut between a first end communicating with the first opening and a second end communicating with the second opening to circulate the plurality of balls with respect to the helical passageway.

31 Claims, 12 Drawing Sheets

U.S. PATENT DOCUMENTS

| | | | |
|---|---|---|---|
| 3,826,153 A | 7/1974 | Sheppard | |
| 3,952,456 A | 4/1976 | Leathley et al. | |
| 3,961,541 A | 6/1976 | Fund et al. | |
| 3,971,264 A | 7/1976 | Detraz et al. | |
| 4,000,661 A | 1/1977 | Menzel | |
| 4,011,764 A | 3/1977 | Buck et al. | |
| 4,074,585 A | 2/1978 | Richaud et al. | |
| 4,074,587 A | 2/1978 | Brusasco | |
| 4,148,226 A | 4/1979 | Benton | |
| 4,177,690 A | 12/1979 | Klinkenberg | |
| 4,211,125 A | 7/1980 | Benton | |
| 4,221,137 A | 9/1980 | Futaba | |
| 4,226,137 A | 10/1980 | Sharp | |
| 4,272,476 A | 6/1981 | Benton | |
| 4,274,297 A | 6/1981 | Blurock et al. | |
| 4,295,384 A | 10/1981 | Brandt et al. | |
| 4,557,156 A | 12/1985 | Teramachi | |
| 4,604,911 A | 8/1986 | Teramachi | |
| 4,677,869 A | 7/1987 | Mayfield | |
| 4,750,378 A | 6/1988 | Sheppard | |
| 4,859,394 A | 8/1989 | Benton et al. | |
| 4,896,552 A | 1/1990 | Virga | |
| 4,953,419 A | 9/1990 | Schlenker | |
| 5,005,436 A | 4/1991 | Brusasco | |
| 5,012,687 A | 5/1991 | Hoshide | |
| 5,014,568 A | 5/1991 | Schlenker | |
| 5,063,809 A | 11/1991 | Schlenker | |
| 5,094,119 A | 3/1992 | Virga et al. | |
| 5,109,720 A | 5/1992 | Kasuga | |
| 5,121,647 A | 6/1992 | Teramachi | |
| 5,142,929 A | 9/1992 | Simpson, III | |
| 5,154,091 A | 10/1992 | Bianco | |
| 5,193,409 A | 3/1993 | Babinski | |
| 5,199,169 A | 4/1993 | Bonzak | |
| 5,263,381 A | 11/1993 | Shirai | |
| 5,287,762 A | 2/1994 | Bonzak | |
| 5,337,627 A | 8/1994 | Nakamura | |
| 5,373,755 A | 12/1994 | Rohlinger | |
| 5,388,475 A | 2/1995 | Shear, III | |
| 5,454,278 A | 10/1995 | Kasuga | |
| 5,467,662 A | 11/1995 | Lange et al. | |
| 5,492,030 A | 2/1996 | Benton et al. | |
| 5,492,036 A | 2/1996 | Sato | |
| 5,501,118 A | 3/1996 | Benton | |
| 5,555,770 A | 9/1996 | Dolata et al. | |
| 5,560,251 A | 10/1996 | Babinski | |
| 5,615,467 A | 4/1997 | Simmons et al. | |
| 5,622,082 A | 4/1997 | Machelski | |
| 5,664,459 A * | 9/1997 | Muhleck et al. | 74/424.87 |
| 5,749,265 A | 5/1998 | Namimatsu et al. | |
| 5,791,192 A | 8/1998 | Lee | |
| 5,816,594 A | 10/1998 | Howard | |
| 5,829,883 A | 11/1998 | Kawaguchi et al. | |
| 5,937,700 A | 8/1999 | Brown et al. | |
| 5,988,007 A | 11/1999 | Nishimura | |
| 6,070,479 A | 6/2000 | Shirai | |
| 6,082,209 A | 7/2000 | Yabe et al. | |
| 6,092,434 A | 7/2000 | Matsumoto et al. | |
| 6,095,009 A | 8/2000 | Takagi | |
| 6,101,889 A | 8/2000 | Laskey | |
| 6,112,610 A | 9/2000 | Welling | |
| 6,192,585 B1 | 2/2001 | Buchanan, Jr. et al. | |
| 6,247,846 B1 | 6/2001 | Shirai | |
| 6,282,972 B2 | 9/2001 | Kuramochi et al. | |
| 6,286,383 B1 | 9/2001 | Shirai et al. | |
| 6,352,367 B1 | 3/2002 | Konomoto et al. | |
| 6,397,697 B1 | 6/2002 | Nimomiya et al. | |
| 6,499,374 B1 * | 12/2002 | Ohga | 74/424.82 |
| 6,581,489 B2 | 6/2003 | Ohkubo | |
| 6,681,651 B2 | 1/2004 | Fujita | |
| 6,722,223 B2 | 4/2004 | Kanda et al. | |
| 6,742,408 B2 | 6/2004 | Ohkubo et al. | |
| 6,776,063 B2 | 8/2004 | Watanabe | |
| 6,813,969 B2 | 11/2004 | Huang | |
| 6,813,970 B2 | 11/2004 | Siler et al. | |
| 6,851,330 B2 * | 2/2005 | Buchanan et al. | 74/424.78 |
| 6,851,722 B2 | 2/2005 | Chiu et al. | |
| 2003/0024336 A1 * | 2/2003 | Ohkubo | 74/424.82 |
| 2003/0123651 A1 * | 7/2003 | Chung | 379/413.02 |
| 2004/0000208 A1 * | 1/2004 | Michioka et al. | 74/424.86 |
| 2005/0076733 A1 * | 4/2005 | Yamamoto et al. | 74/424.87 |

\* cited by examiner

BALL SCREW MECHANISM

CROSS-REFERENCE TO RELATED APPLICATIONS

This application claims the benefit of U.S. Provisional Patent Application Ser. No. 60/663,987 for a BALL SCREW MECHANISM, filed on Mar. 22, 2005, which is hereby incorporated by reference in its entirety.

FIELD OF THE INVENTION

The invention relates to a ball screw mechanism wherein rotational motion of a screw is converted to linear motion of a nut.

BACKGROUND OF THE INVENTION

In a ball screw mechanism, rotation of a screw is converted to linear motion of a nut encircling the screw. The screw and nut define respective, aligned helical grooves and a plurality of balls move in the grooves. The path defined by the respective grooves is called the mesh of the ball screw mechanism. The force transfer from screw to the nut occurs across the balls. In most ball screws, the extent of linear travel of the nut requires that balls moving in the mesh must exit at one end of the mechanism and re-enter the mesh at a second end. The balls are directed to the second end of the mechanism for re-entry into the mesh. A return guide is engaged with the nut to define a return path along which the plurality of balls move between the first and second ends.

SUMMARY OF THE INVENTION AND ADVANTAGES

The invention provides a ball screw mechanism including a screw having a first axis and at least one screw groove extending along a first helical path about the first axis. The ball screw mechanism also includes a nut having a first aperture receiving the screw. The nut also includes at least one nut groove extending along a second helical path about the first axis between first and second edges disposed on opposite sides of the screw. At least one screw groove and at least one nut groove are aligned and cooperate to form a helical passageway extending at least 180 degrees about the first axis between a first opening at the first edge and a second opening at the second edge. The ball screw mechanism also includes a plurality of balls moving, in part, along the helical passageway. The ball screw mechanism also includes an external ball nut return radially spaced from the screw extending at least partially around the nut between a first end communicating with the first opening and a second end communicating with the second opening to circulate the plurality of balls with respect to the helical passageway.

BRIEF DESCRIPTION OF THE DRAWINGS

Other advantages of the present invention will be readily appreciated as the same becomes better understood by reference to the following detailed description when considered in connection with the accompanying drawings wherein.

Figure 20:
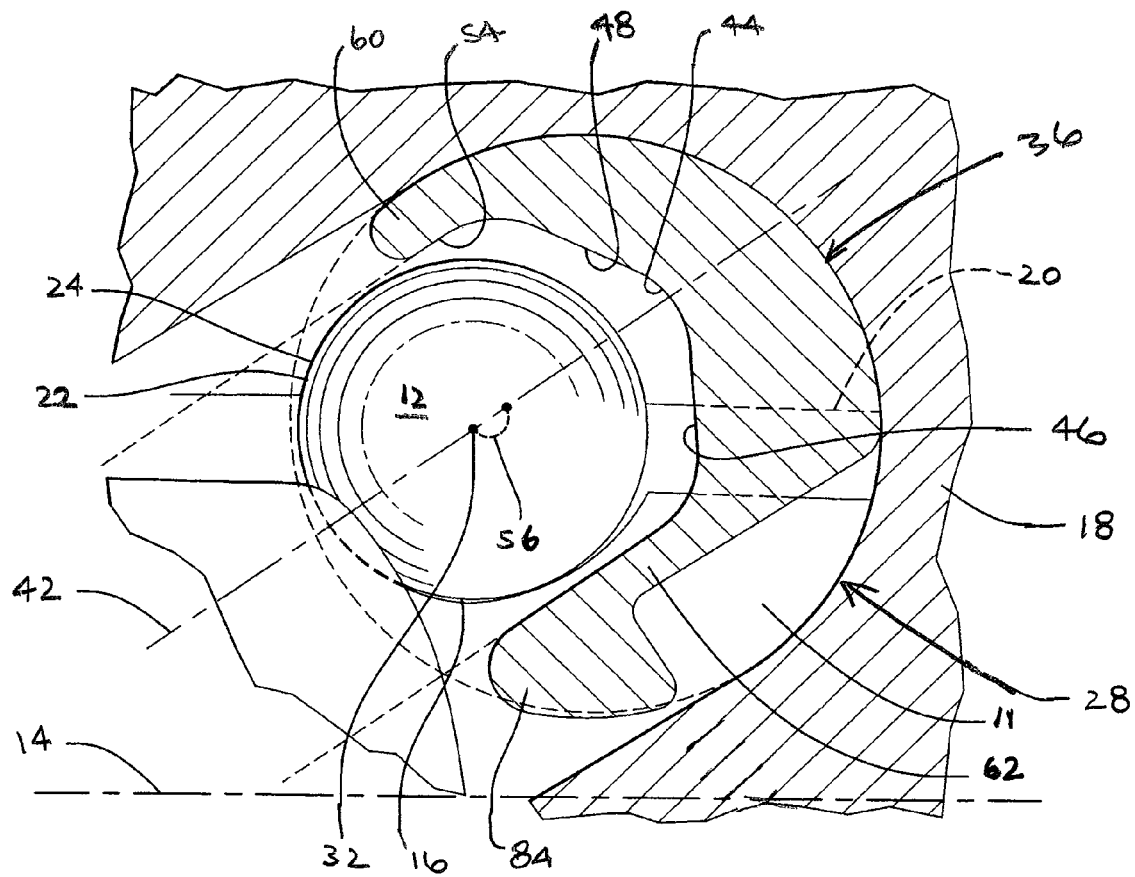
FIG. 20 is an enlarged, fragmentary cross-section planar view of the ball screw mechanism of FIG. 7 along line 20-20 of FIG. 9, showing an opening of the mesh of the ball screw mechanism wherein a ball is exiting the mesh.
Figure 21:
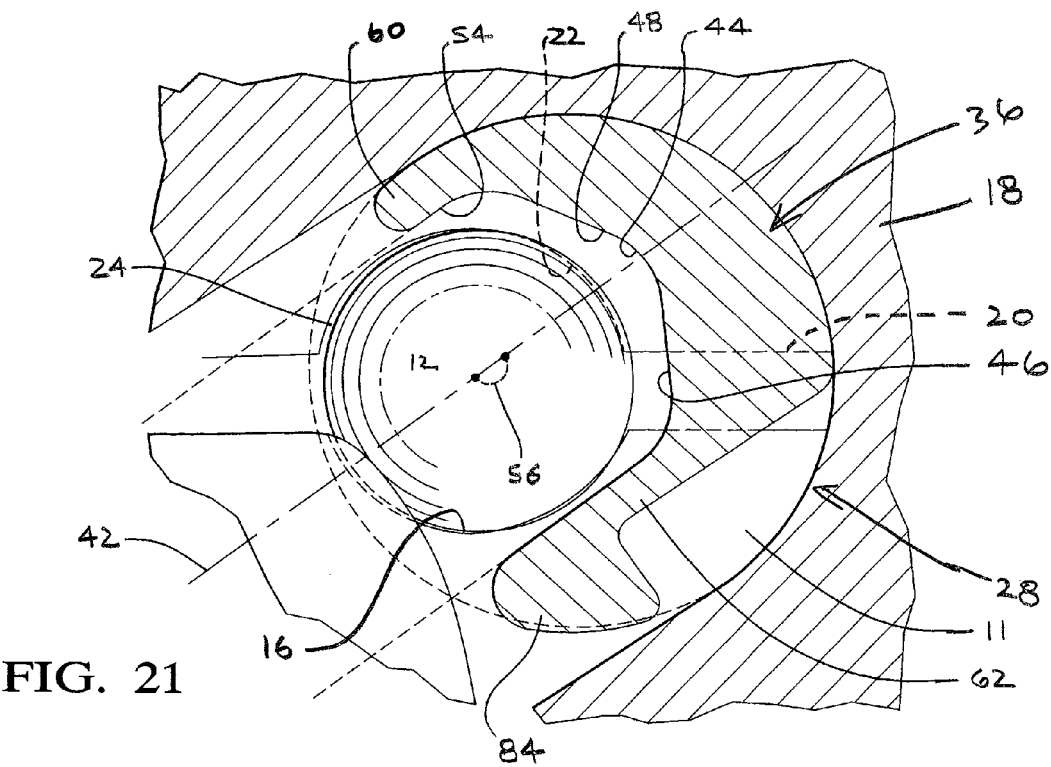
Figure 22:
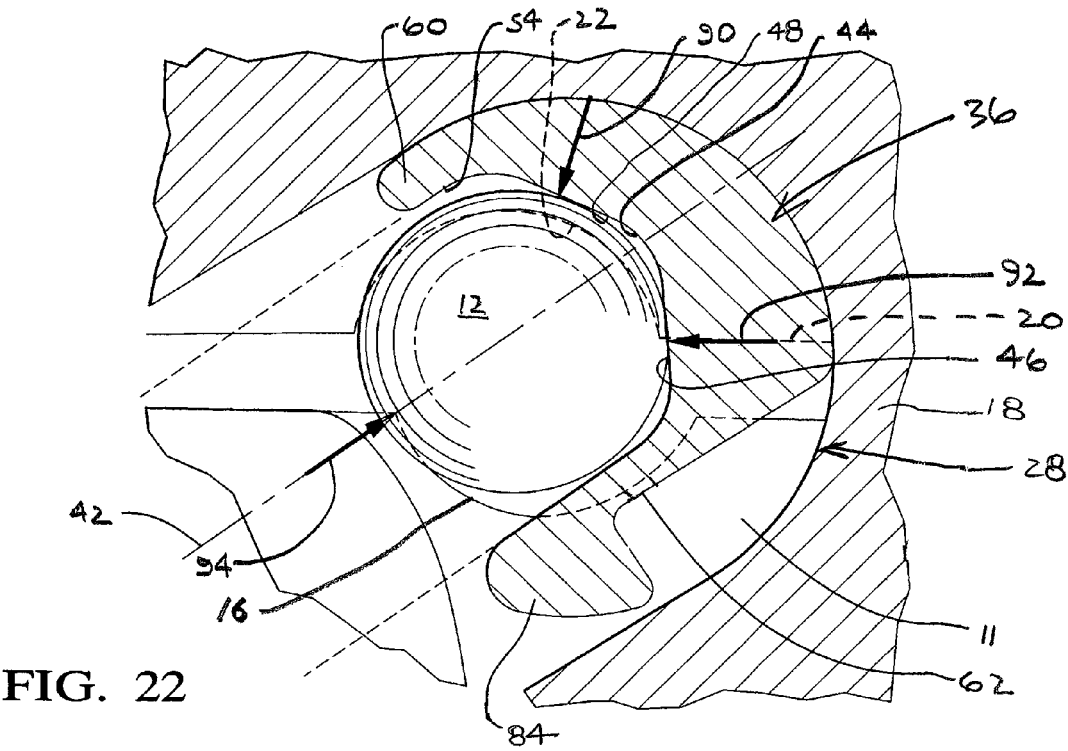

FIG. 21 is an enlarged, fragmentary cross-section planar view corresponding to FIG. 20 wherein the exiting ball has moved further from the opening of the mesh; and FIG. 22 is an enlarged, fragmentary cross-section planar view corresponding to FIGS. 20 and 21 wherein the exiting ball has left the mesh and is being pinched between the external ball nut return and the screw of the ball screw mechanism.

DETAILED DESCRIPTION OF THE PREFERRED EMBODIMENT

Referring now to FIGS. 7-13, a ball screw mechanism 10 includes a screw 11 having a first axis 14 and at least one screw groove 16 extending along a first helical path about the first axis 14. The first axis 14 is the centered, longitudinal axis of the screw 11. The first axis 14 is also the centered, longitudinal axis of the ball screw mechanism 10. The screw 11 can be driven in rotation by a motor (not shown).

The ball screw mechanism 10 also includes a nut 18 having a first aperture 20 receiving the screw 11. The nut 18 encircles the screw 11 and moves linearly in response to rotation of the screw 11. The nut 18 also includes at least one nut groove 22 extending along a second helical path about the first axis 14 between first and second edges 24, 26 disposed on opposite sides of the screw 11.

Figure 17:
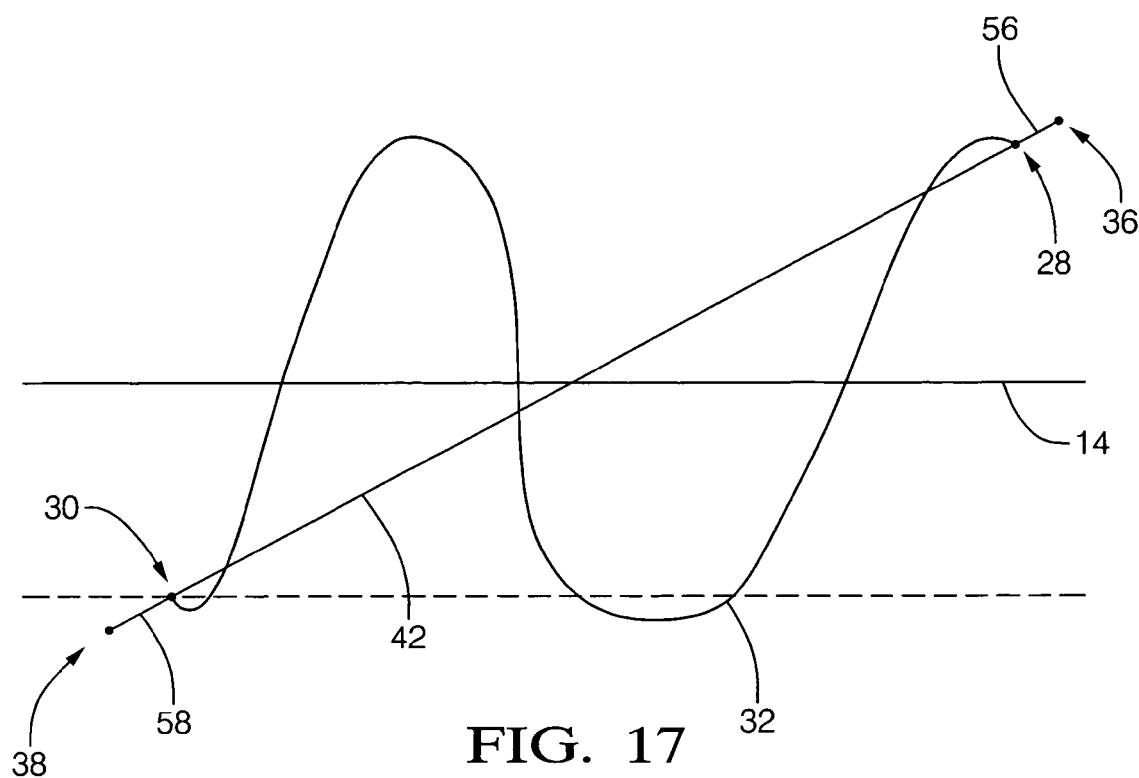
FIG. 17 is a schematic top view of the ball screw mechanism of FIG. 7, illustrating the reversible path of movement of each of the plurality of balls of the ball screw mechanism through the mesh and the return path.
Figure 18:
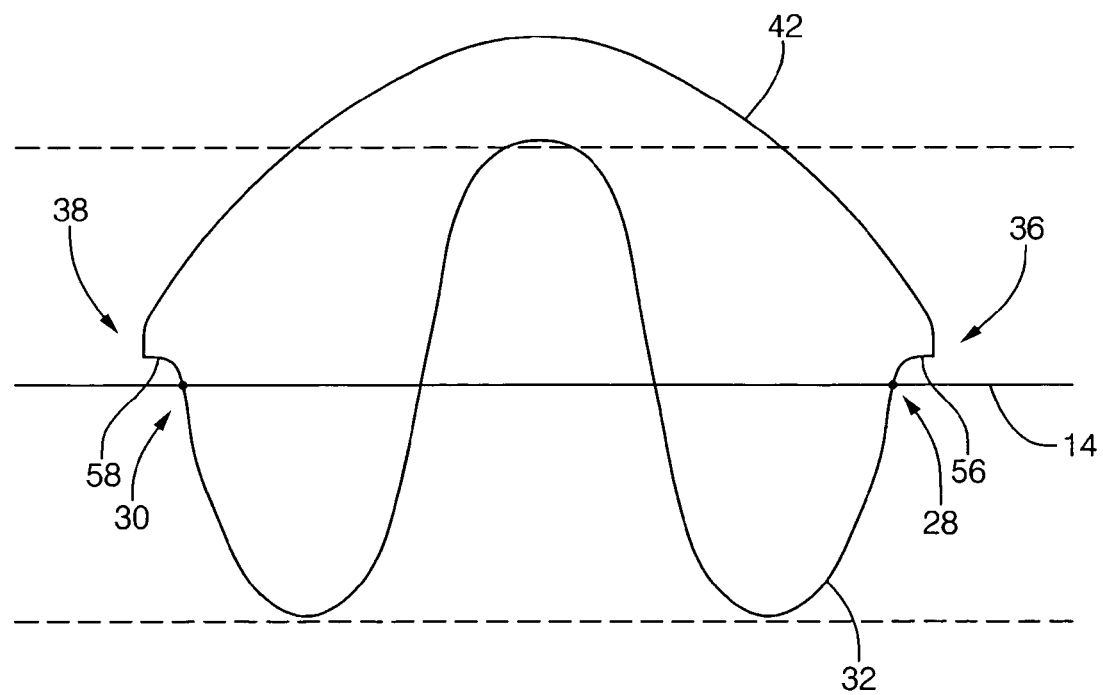
FIG. 18 is a schematic view of the ball screw mechanism of FIG. 7 in the direction of arrow 18, illustrating the reversible path of movement of each of the plurality of balls of the ball screw mechanism through the mesh and the return path.
Figure 19:
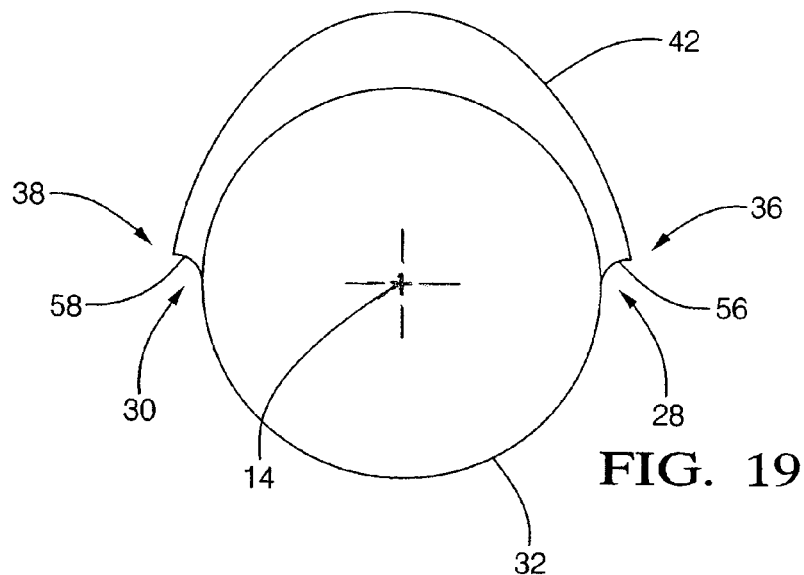
FIG. 19 is a schematic right-hand end view of the ball screw mechanism of FIG. 7 illustrating the reversible path of movement of each of the plurality of balls of the ball screw mechanism through the mesh and the return path.

The at least one screw groove 16 and the at least one nut groove 22 are aligned and cooperate to form a helical passageway 32 (best seen in FIGS. 17-19), or mesh, extending at least 180 degrees about the first axis 14 between a first opening 28 at the first edge 24 and a second opening 30 at the second edge 26. A plurality of balls, such as ball 12, move along the helical passageway 32. The balls 12 also move out of and into the helical passageway 32.

Referring now additionally to FIGS. 1-6, the ball screw mechanism 10 also includes an external ball nut return 34 for re-circulating the plurality of balls 12 between the openings 28, 30 of the helical passageway 32. The balls 12 cross over the nut 18 during re-circulation between the first and second openings 28, 30, moving along a return path 42 defined by the external ball nut return 34 (best seen in FIGS. 17-19). The external ball nut return 34 of the exemplary embodiment is formed from plastic in a two-piece mold. An alternative embodiment of the invention could include a external ball nut return formed from metal or formed from plastic in a more complex mold. The external ball nut return 34 includes integrally formed wings 74, 76 defining apertures 78, 80, respectively. The nut 18 defines corresponding apertures and bolts can be inserted through the apertures 78, 80 and the apertures of the nut 18 to fixedly engage the nut 18 and the external ball nut return 34 with respect to one another. In an alternative embodiment of the invention, the nut 18 and the external ball nut return 34 could be engaged with respect to one another via a snap-fit connection. In another alternative embodiment of the invention, the external ball nut return 34 could be maintained in position relative to the nut 18 by a housing surrounding both the external ball nut return 34 and the nut 18.

The external ball nut return 34 extends at least partially around the nut 18 between a first end 36 communicating with the first opening 28 and a second end 38 communicating with the second opening 30. The external ball nut return ends 36, 38 are individually received in apertures that are defined by the nut 18 and that communicate with the first aperture 20. The external ball nut return 34 is resiliently deformed when the ends 36, 38 are received in apertures defined by the nut 18.

In an alternative embodiment of the invention, the external ball nut return 34 could be rigid and non-deformed during engagement with the nut 18. In the exemplary embodiment of the invention, the external ball nut return 34 cooperates with the nut 18 to define the return path 42. The nut 18 defines a surface 86 facing radially outwardly toward an inner surface 54 of the external ball nut return 34.

The external ball nut return 34 is radially spaced from the screw 11. The portion of the external ball nut return 34 associated with ball circulation does not extend into the screw groove 16 to deflect the ball 12 out of the groove 16. In other words, as will be described more fully below, the ball screw mechanism 10 is fingerless with respect to ball deflection. However, a pair of wipers 82, 84 are integrally formed with the external ball nut return 34 and extend into the screw groove 16 to prevent debris from entering the helical passageway. The wipers 82, 84 do not engage a ball exiting the mesh 32 in the exemplary embodiment of the invention.

An exiting ball 12 of the plurality of balls can exit the helical passageway 32 at the first opening 28. The exiting ball 12 is received by the first end 36 of the external ball nut return 34. In the exemplary embodiment of the invention, the opening of first end 36 is formed by the inner surface 54 as a channel 40 opening oblique to the first axis 14 in a plane defining the first opening 28, best shown in FIG. 20. The opening of the channel 40 is defined between first and second walls 60, 62 of the external ball nut return 34.

In operation, a ball 12 reaches the first edge 24 at the first opening 28 after moving through the helical passageway 32. It is noted that the ball 12 can move in either direction, from first opening 28 to second opening 30 or from second opening 30 to first opening 28, in response to the direction of rotation of the screw 11. Only movement in the helical passageway 32 from the second opening 30 to the first opening 28 is described herein, however the operation from first opening 28 to second opening 30 is substantially the same.

A void is defined by the inner surface 54 of the first end 36 relative to the first edge 24. The first end 36 is spaced from the first edge 24, best shown in FIG. 20. The inner surface 54 is radially outwardly spaced from the first edge 24 relative to the first axis 14. A surface portion 48 of the surface 54 is spaced from a center of the helical passageway 32 greater than a radius of the exiting ball 12 in a plane defining the first opening 28. When the center of the exiting ball 12 passes the edge 24, the ball 12 will tend to move into the void, toward the surface 54. In other words, the ball 12 rolls over the first edge 24 and into a bottom 44 of the channel 40.

The movement of the ball 12 toward the inner surface 54 is encouraged by the ball "behind" the exiting ball 12 since the center of this preceding ball will be closer to the first axis 14 than the center of the exiting ball 12. The exiting ball 12 in general rotates about the edge 24 and into engagement with the surface portions 46, 48. This movement is shown by a first arcuate path 56 in FIGS. 17-19 and by comparison between FIGS. 20 and 21. The first substantially arcuate path 56 links the return path 42 and helical passageway 32. A second arcuate path 58, substantially the mirror of path 56, connects the paths 32, 42 between the second opening 30 and the second end 38. The reasons for variation from the arc defined by the return path 42 will be explained below. The return path 42 and the first substantially arcuate path 56 are substantially coplanar. After movement along the first arcuate path 56, the ball 12 moves from the first end 36 along the return path 42. The exemplary return path 42 is defined by the channel 40 and is substantially planar.

The shape and orientation of the channel 40 decreases the complexity of structure required to realize movement of the exiting ball 12 out of the helical passageway 32. Motivating forces are generated in the helical passageway 32 on the plurality of balls 12 and are realized at the first opening 28 of the helical passageway 32 on the exiting ball 12. The channel 40 is oriented to "catch" the exiting ball 12 as it is pushed out of the helical passageway 32 by the neighboring motivated balls. Also, the channel 40 of the exemplary embodiment is oriented such that the exiting ball 12 is moved substantially directly to the point of re-entry back into the helical passageway 32, namely the second opening 30. The channel 40 at the first end 36 is centered on the return path 42. As a result, the shape and orientation of the channel 40 at the first end 36 increases the likelihood that motivating forces acting on the exiting ball 12 will be efficiently aligned along the return path 42. Enhancing the alignment of forces decreases the load on the external ball nut return 34.

The exiting ball 12 is received by the surfaces 46, 48 and begins movement along the return path 42. As the ball 12 starts to move along the return path 42, the surface 48 acts as a first deflecting surface 48. The surface 48 extends oblique to the first axis 14 in a plane defining the first opening 28 and cooperates with the screw groove 16 at the first opening 28 to cam the exiting ball 12 radially outward with respect to the first axis 14. As best shown by the force arrows in FIG. 22, the surface 48 and groove 16 cam the ball 12. The relative orientation between the surface 48 and the groove 16 during camming results in the ball 12 being urged along the return path 42. The force that is generated by pinching the ball 12 is efficiently directed to motivate the chain of balls 12 on the return path 42 toward the second opening 30.

At the external ball nut return ends 36, 38, the surface portions 46, 48 are substantially planar. The surface portions 46, 48 transition from planar in the arching portion of the path 42. For example, the surface portions 46, 48 of the exemplary return 34 are truncated-conical and tangent to the planes defined at the ends 36, 38. The return path 42 can be a true arch, a gothic arch, or even a shape like a door frame.

The surface portion 46 acts as a second deflecting surface to the extent that the surface 46 guides movement of the ball 12. The surface 46 extends oblique to the first deflecting surface portion 48 in the plane defining the first opening 28. The second deflecting surface portion 46 cooperates with the screw groove 16 and with the first deflecting surface 48 at the first opening 28 to pinch the exiting ball 12. In the exemplary embodiment of the invention, the surface portions 46, 48 extend the length of the external ball nut return 34 and are integrally formed with one another.

In the exemplary embodiment of the invention, the external ball nut return 34 includes a generally v-shaped bottom 44 between the surface portions 46, 48. The surface portions 46, 48 are disposed transverse to one another to guide movement of the plurality of balls 12 circulating between the first and second openings 28, 30. Each of the plurality of balls 12 is disposed in two-point contact with the external ball nut return 34 during movement between the first and second ends 36, 38. The v-shaped bottom 44 extends the length of the exemplary external ball nut return 34. At least one of the surface portions 46, 48 is oblique with respect to the first axis 14 in a plane defining the first opening 28.

The shape of the bottom 44 provides at least two significant benefits to the exemplary embodiment of the invention. First, forces generated by the ball 12 and acting on the external ball nut return 34 are spread over two points rather than one and the contact stress on the external ball nut return 34 is decreased. Second, interaction between the ball 12 and the surfaces 46, 48 reduces the likelihood that adjacent balls 12 will toggle while moving along the return path 12. This further increases the likelihood that motivating forces acting on the exiting ball 12 will be efficiently aligned along the return path 42.

In another aspect of the exemplary embodiment of the invention, the external ball nut return 34 includes an outer surface 50. The outer surface 50 faces radially outwardly with respect to the first axis 14 and extends between the first and second ends 36, 38 along a first path 52, best seen in FIGS. 4 and 6. The inner surface 54 includes the surface portions 46, 48 and guides movement of the plurality of balls 12 circulating between the first and second openings 28, 30. The inner surface 54 faces radially inwardly with respect to the first axis 14 and extends between the first and second ends 36, 38 along the return path 42. The first path 52 and the return path 42 are transverse, or rotated, with respect to one another. The paths 52, 42 are radially spaced from one another by the wall thickness of the external ball nut return 34. Also, both of the paths 52, 42 generally intersect at an axis 64 (seen in FIGS. 4 and 5) extending approximately at a center of the external ball nut return 34. Since the paths 52, 42 are radially spaced from one another by the wall thickness of the external ball nut return 34, the paths 52, 42 do not actually intersect, but appear to intersect if shown in the top or bottom view of the return 34. The return path 42 extends in the plane shown in FIG. 11 and the first path 52 extends in the plane shown in FIG. 10.

Figure 1:
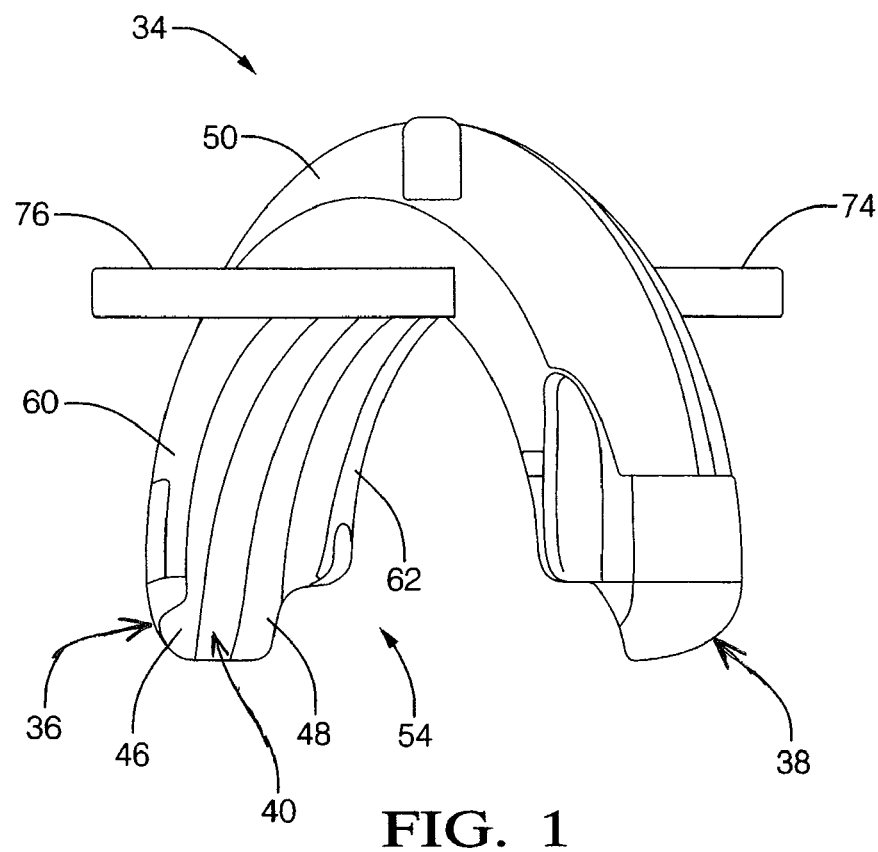
FIG. 1 is a first perspective view of an external ball nut return according to a first exemplary embodiment of the invention.
Figure 2:
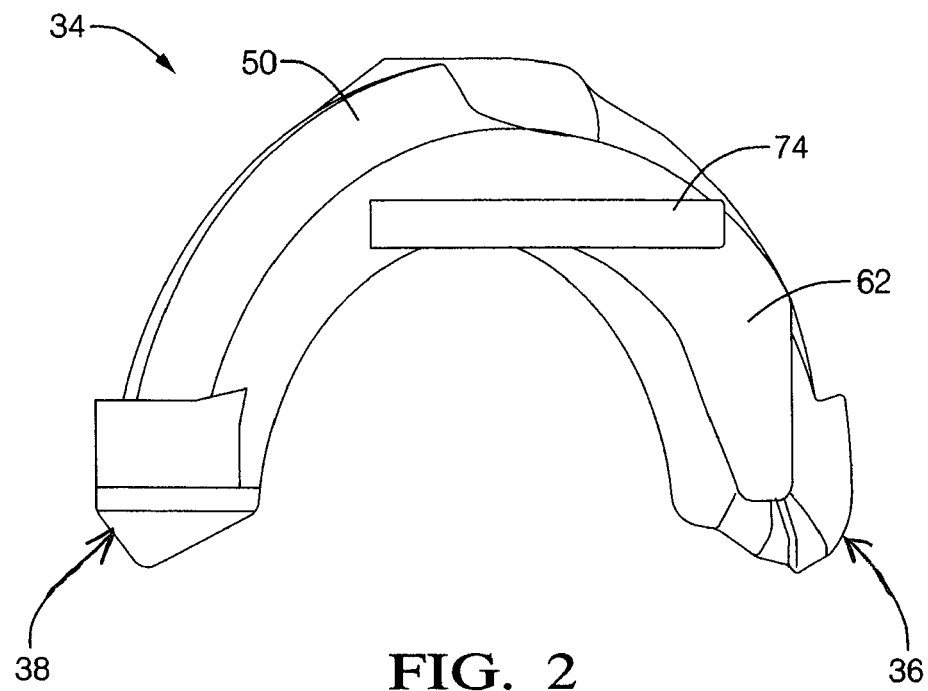
FIG. 2 is a second perspective view of the first exemplary external ball nut return.
Figure 3:
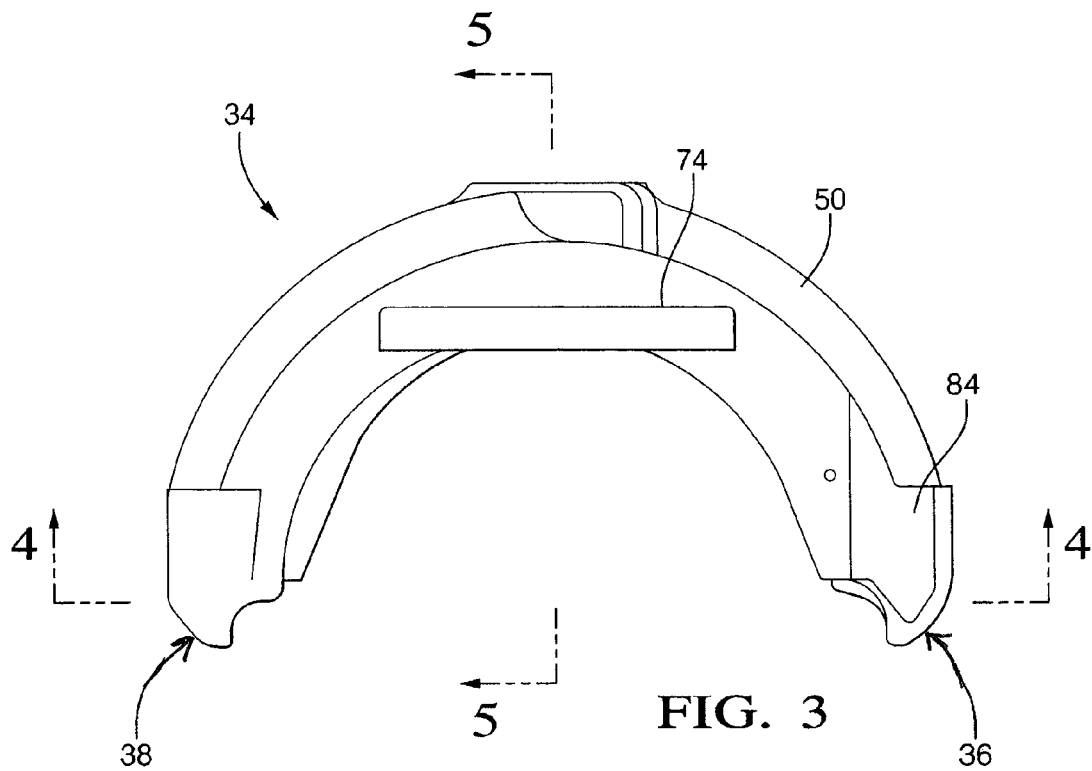
FIG. 3 is a front view of the first exemplary external ball nut return.
Figure 4:
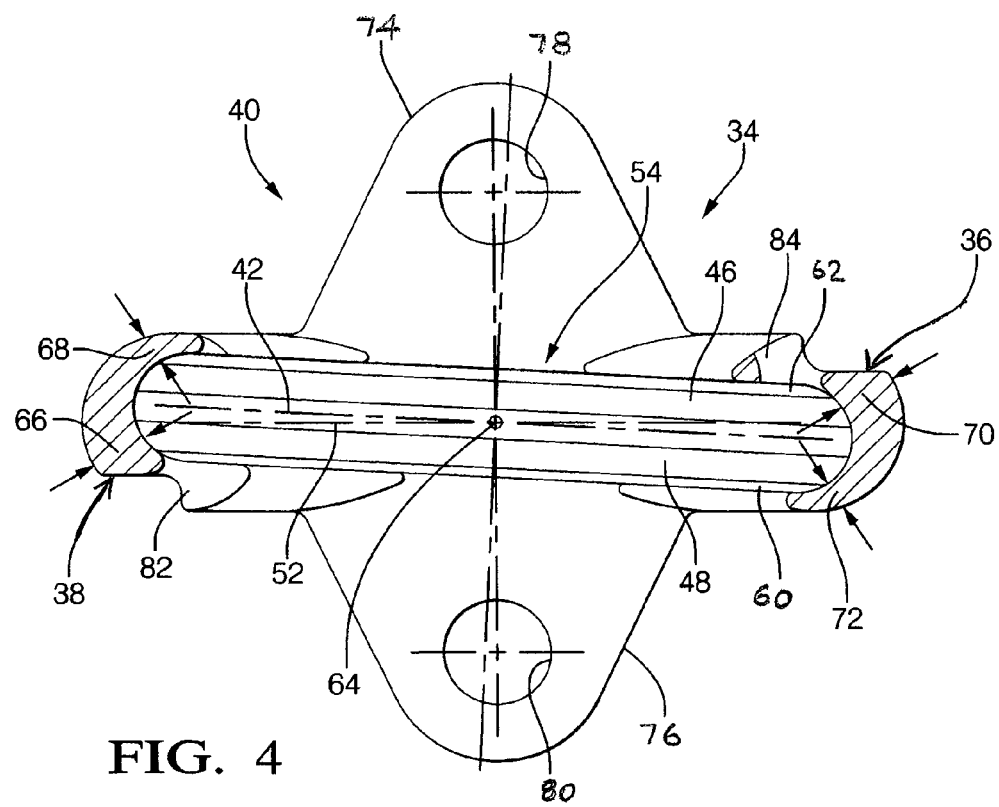
FIG. 4 is a cross-sectional view of the first exemplary external ball nut return taken along section line 4-4 in FIG. 3.
Figure 5:
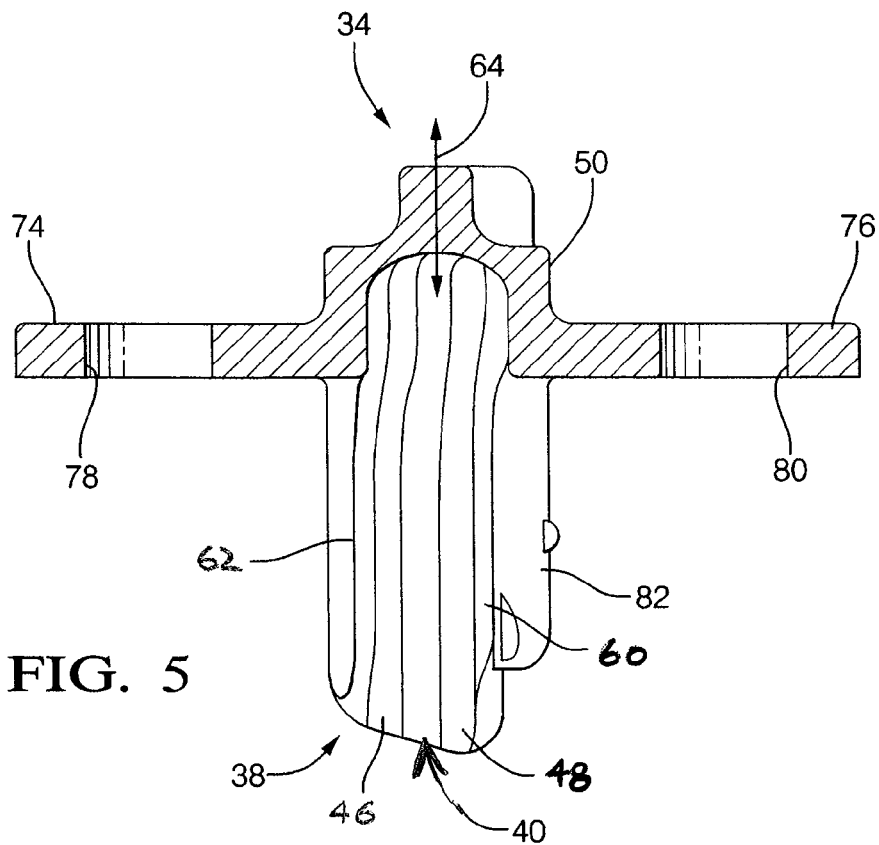
FIG. 5 is a cross-sectional view of the first exemplary external ball nut return taken along section line 5-5 in FIG. 3.
Figure 6:
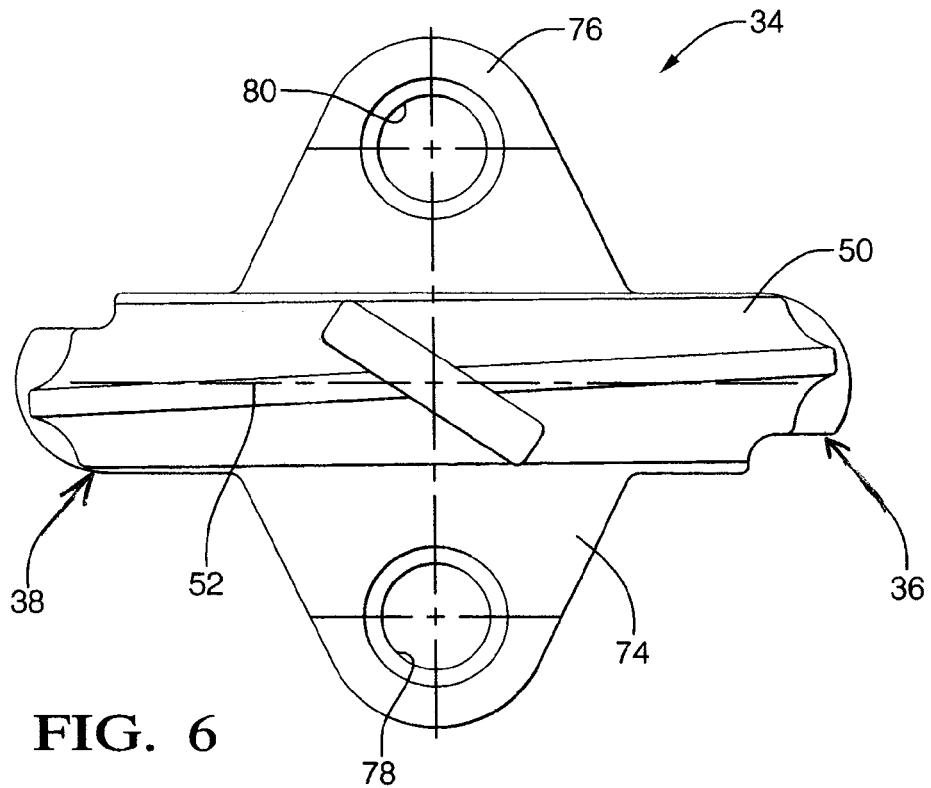
FIG. 6 is a top view of the first exemplary external ball nut return.
Figure 7:
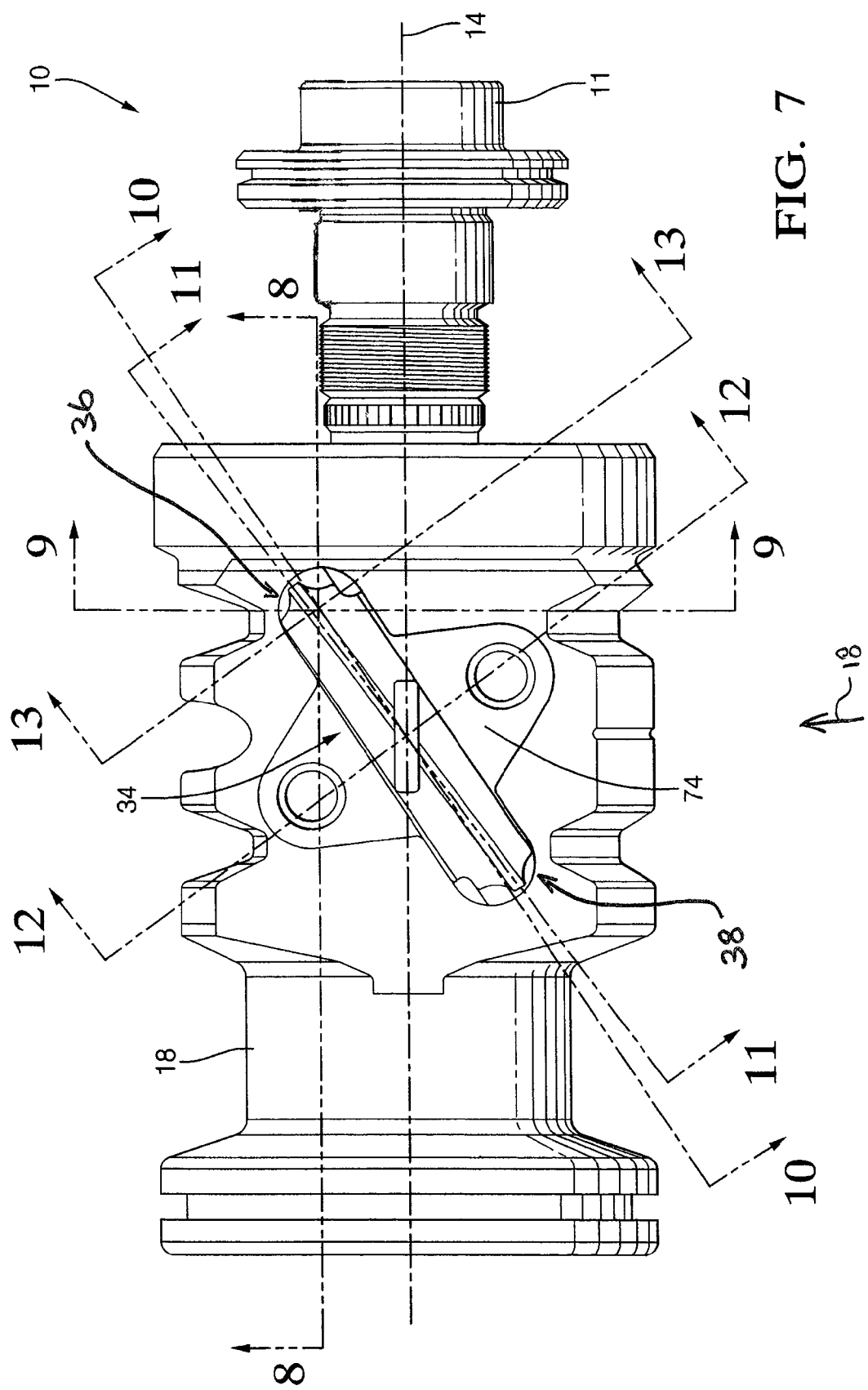
FIG. 7 is a top view of a ball screw mechanism having the first exemplary external ball nut return.
Figure 8:
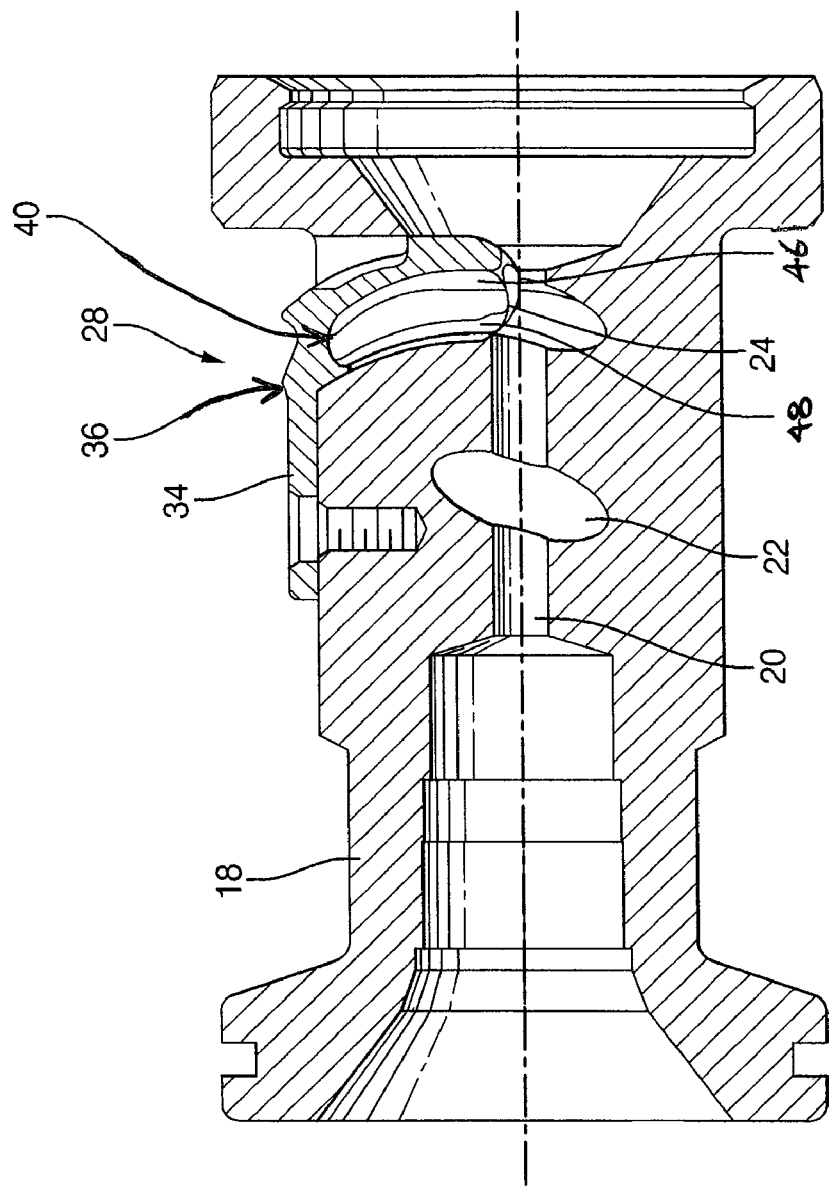
FIG. 8 is a cross-sectional view of the ball screw mechanism of FIG. 7 taken along section 8-8, wherein the section is taken at a point of entry/exit for balls moving between a return path defined by the first exemplary external ball nut return and a mesh defined by the ball screw mechanism, the balls removed to enhance clarity.
Figure 9:
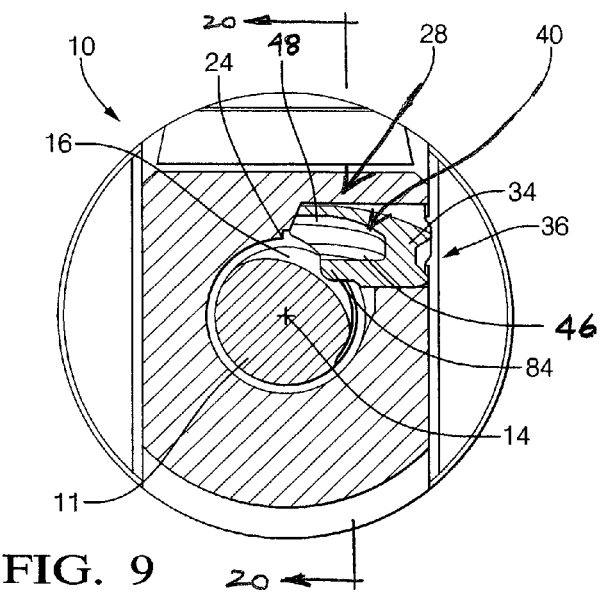
FIG. 9 is a cross-sectional view of the ball screw mechanism of FIG. 7 taken along section 9-9, wherein the section is taken at the point of entry/exit shown in FIG. 8 and is perpendicular to the section shown in FIG. 8, the balls removed to enhance clarity.
Figure 10:
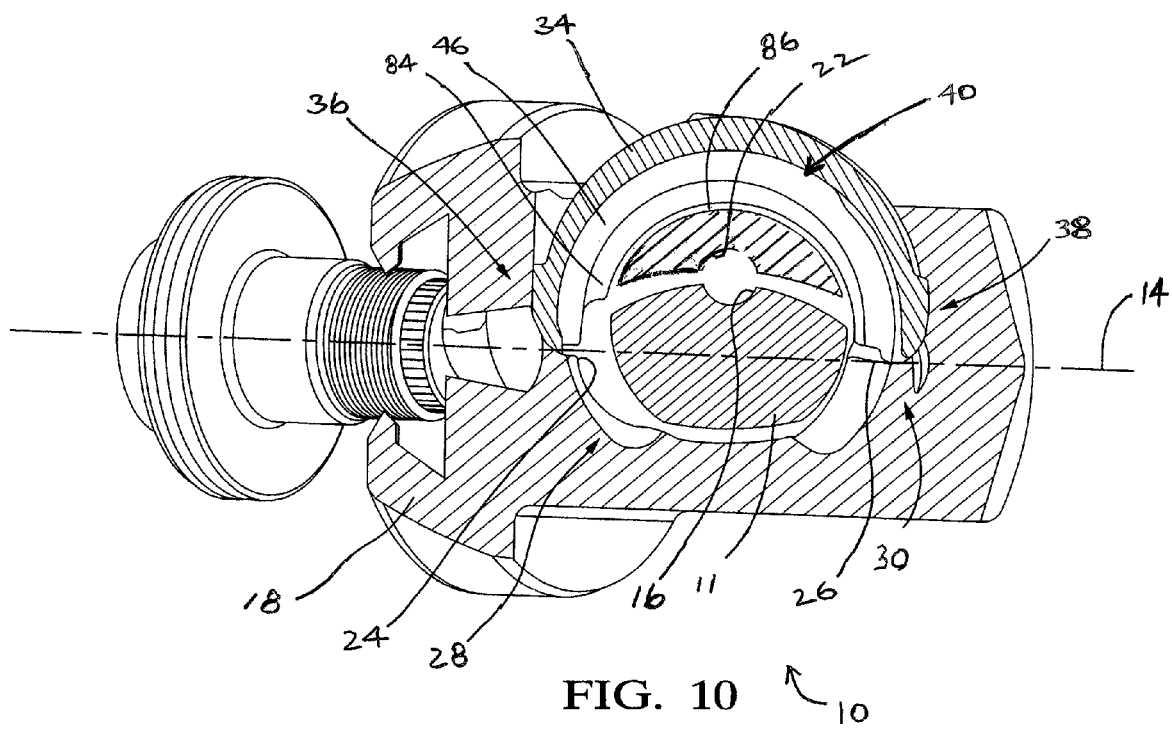
FIG. 10 is a cross-sectional view of the ball screw mechanism of FIG. 7 taken along section line 10-10, wherein the section cuts the first exemplary external ball nut return in half, the balls removed to enhance clarity.
Figure 11:
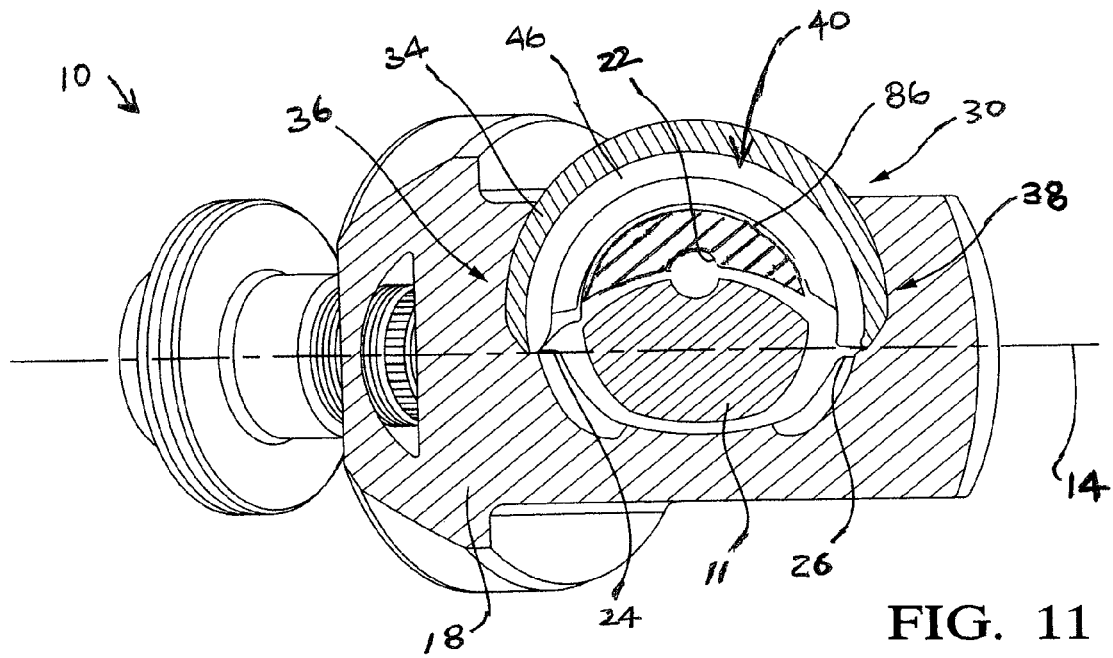
FIG. 11 is a cross-sectional view of the ball screw mechanism of FIG. 7 taken along section line 11-11, wherein the section cuts the return path defined by the first exemplary external ball nut return in half, the balls removed to enhance clarity.
Figure 12:
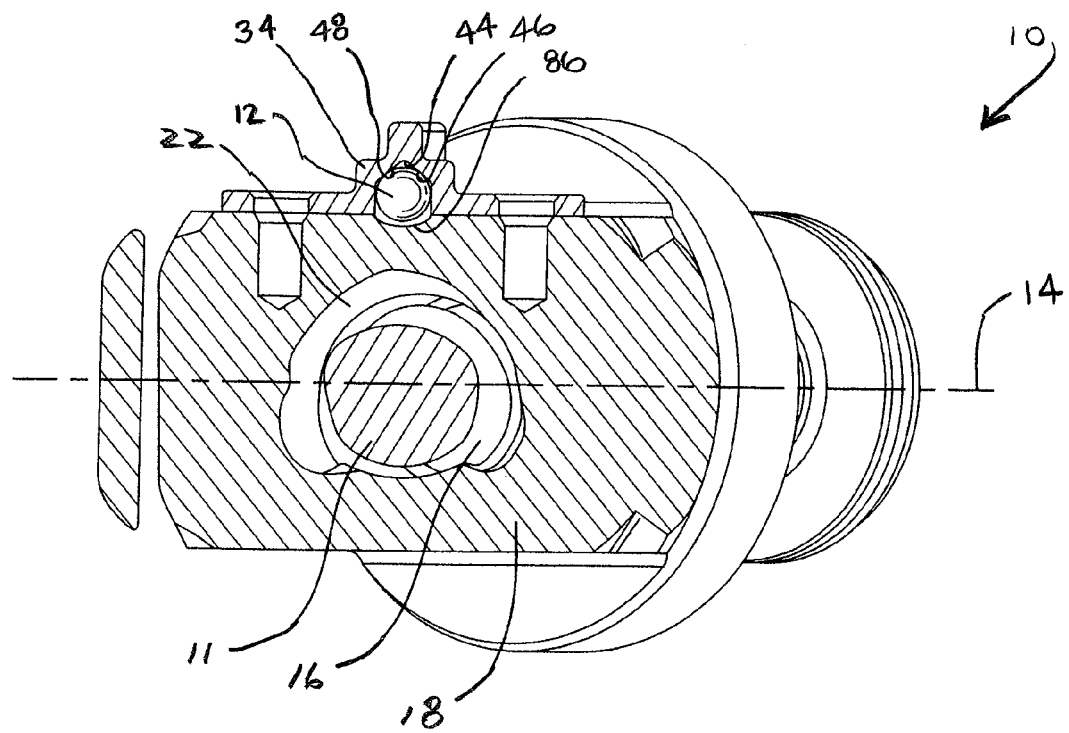
FIG. 12 is a cross-sectional view of the ball screw mechanism of FIG. 7 taken along section line 12-12, wherein the section is perpendicular to the section shown in FIG. 10.
Figure 13:
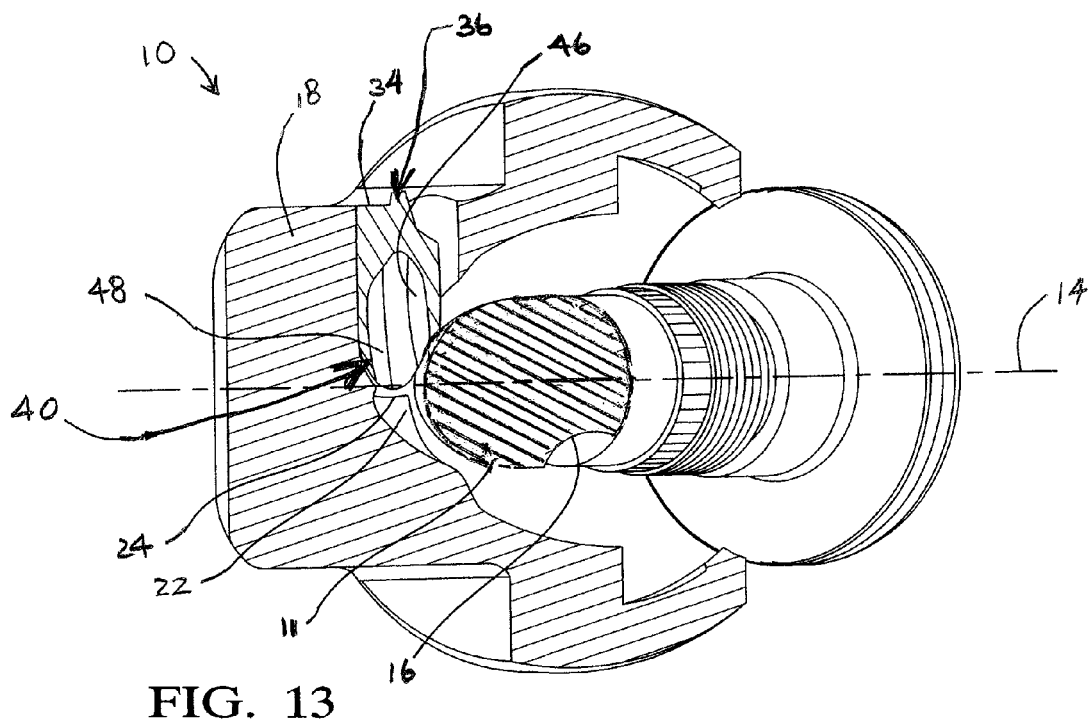
FIG. 13 is a cross-sectional view of the ball screw mechanism of FIG. 7 taken along section line 13-13, wherein the section is taken at the point of entry/exit shown in FIGS. 8 and 9, and is obliquely angled with respect to both of the sections shown in FIGS. 8 and 9 and is parallel to the section shown in FIG. 12, the balls removed to enhance clarity.
Figure 14:
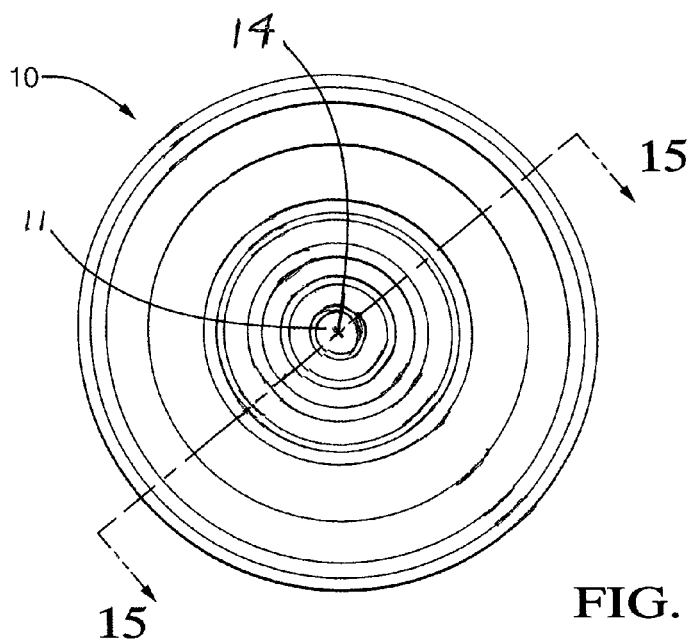
FIG. 14 is a left-hand end view of the ball screw mechanism of FIG. 7.
Figure 15:
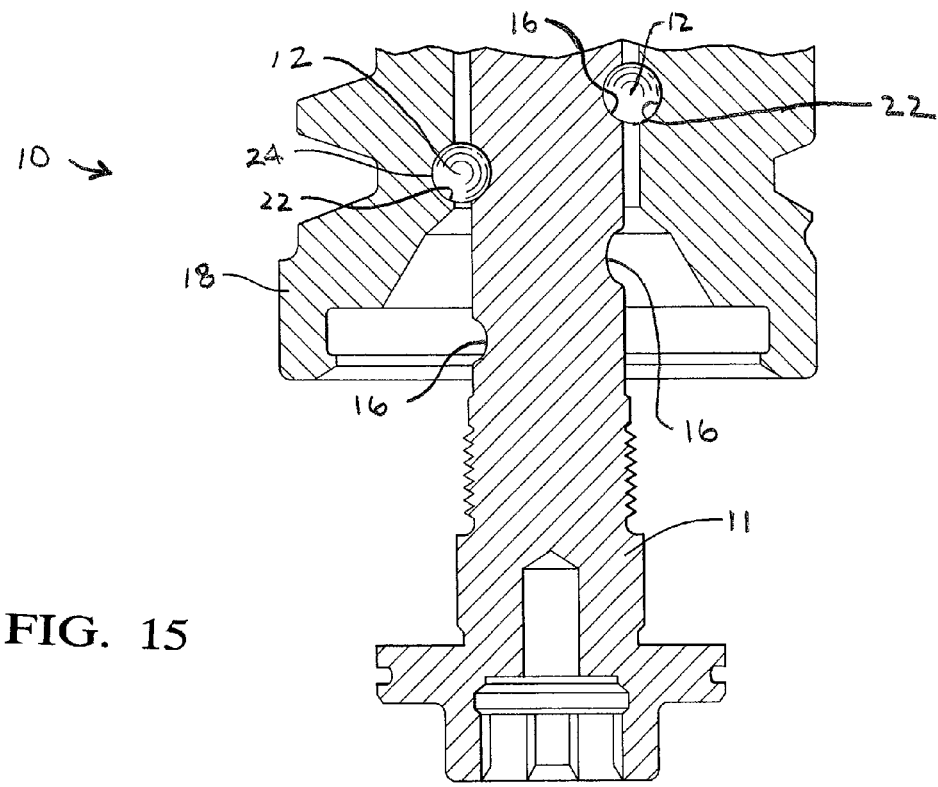
FIG. 15 is a fragmentary cross-sectional view of the ball screw mechanism of FIG. 14 taken along section line 15-15, wherein the section is taken through the point of entry/exit shown in FIGS. 8, 9 and 13 and is perpendicular with respect to all of the sections shown in FIG. 9 such that the section looks into the return path.
Figure 16:
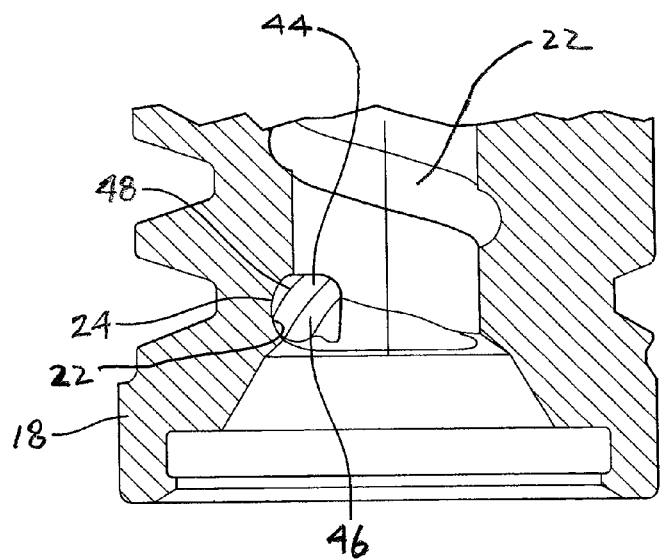
FIG. 16 is a fragmentary cross-sectional view corresponding to FIG. 15 wherein the screw and exiting ball of the ball screw mechanism have been removed to enhance clarity of the return path defined by the first exemplary external ball nut return.

A wall thickness defined between the inner and outer surfaces 54, 50 of the external ball nut return 34 varies between the first and second ends 36, 38 because the paths 52, 42 are transverse. This is best shown in FIG. 4 wherein a first wall thickness 66 adjacent the second end 38 is relatively thicker and a second wall thickness 68 is relatively thinner. With respect to the first end 36, a third wall thickness 70 is relatively thicker and a fourth wall thickness 72 is relatively thinner. The thicknesses 66 and 70 are substantially the same and are disposed on opposite sides of the path 42. Similarly, the thicknesses 68 and 72 are substantially the same and are disposed on opposite sides of the path 42. Disposing the paths 42, 52 transverse relative to one another provides the advantage of thickening up the portions of the external ball nut return 34 that will experience relatively higher stress. For example, as will be described in greater detail below, camming of the exiting ball 12 occurs generally adjacent the relatively thicker wall thickness 70.

In another aspect of the exemplary embodiment of the invention, the return path 42 is substantially arcuate such that any continuous linear section of the return path 42 is less than or equal to a diameter of one of the plurality of balls 12. The balls 12 moving along the return path thus cooperate such that the balls 12 will press radially outwardly, riding only on the surface portions 46, 48 (or the bottom 44 in other embodiments) of the external ball nut return 34. For example, neighboring balls on opposite sides of any particular ball contact the subject ball at respective positions closer to the center of the arcuate return path 42, the cooperation known as keystoning. The substantially arcuate shape of the return path 42 increases the likelihood that motivating forces acting on the exiting ball 12 will be efficiently aligned along the return path 42 and enhancing the alignment of forces decreases the load on the external ball nut return 34. Also, the return path 42 is substantially planar and the external ball nut return 34 can be molded in a two piece mold.

As set forth above, the arcuate path sections 56, 58 are substantially arcuate and may be multi-planar. Between the exit point of the of the ball 12 shown in FIG. 20 to the position wherein the ball 12 is received by the external ball nut return 34 shown in FIG. 22, the ball 12 moves slightly out of single plane until it contacts the surfaces 46, 48. Further deviation from a true arc occurs due to camming action between the surface 48 and the groove 16. It is also noted that the view of the external ball nut return 34 shown in FIG. 20 has been added for clarity. The external ball nut return 34 is slightly spaced from the instantaneous plane defined at the first opening 28.

Each of the plurality of balls 12 moving into the helical passageway 32 at the second opening 30 moves along the second substantially arcuate path 58 over the second edge 26 from the second end 38. The first and second substantially arcuate paths 56, 58 are mirrored relative to one another on opposite sides of the return path 42, about the axis 64. The return path 42 and the first substantially arcuate path 56 and the second substantially arcuate path 58 are substantially co-planar with one another. The arrangement of paths 42, 56, 58 increases the likelihood that motivating forces acting on the exiting ball 12 will be efficiently aligned along the return path 42 and enhancing the alignment of forces decreases the load on the external ball nut return 34.

As best seen in FIG. 22, the first deflecting surface portion 48, the second deflecting surface portion 46, and the screw groove 16 cooperate to generate pinching forces that urge the exiting ball 12 along the return path 42. These pinching forces also enhance ball-to-ball camming forces. The geometry of the exemplary embodiment enhances the use of mesh forces to facilitate ball return. The first deflecting surface portion 48, the second deflecting surface portion 46, and the screw groove 16 are disposed relative to one another such that a first normal force 90 acts on the exiting ball 12 at the first deflecting surface portion 48 and a second normal force 92 acts on the exiting ball 12 at the second deflecting surface portion 46 and a third normal force 94 acts on the exiting ball 12 at the screw groove 16. The first normal force 90 and the second normal force 92 are defined in a first plane. The third normal force 94 is defined in second plane transverse to the first plane. The third normal force 94 is shown with the arrowhead partially hidden because the third normal force 94 is acting on the exiting ball 12 in a plane transverse to the plane shared by the first and second normal forces 90, 92. As a result, the third normal force 94 includes a component that acts on the exiting ball 12 to urge the exiting ball 12 out of the page. In operation, this component of the third normal force 94 urges the exiting ball along the return path 42.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ball screw mechanism comprising:
   a screw having a first axis and at least one screw groove extending along a first helical path about said first axis;
   a nut having a first aperture receiving said screw and having at least one nut groove extending along a second helical path about said first axis between first and second edges disposed on opposite sides of said screw wherein said at least one screw groove and said at least one nut groove are aligned and cooperate to form a helical passageway extending at least 180 degrees about said first axis between a first opening at said first edge and a second opening at said second edge;
   a plurality of balls moving, in part, along said helical passageway; and
   an external ball nut return radially spaced from said screw and extending at least partially around said nut between a first end having an opening communicating with said first opening and a second end having an opening communicating with said second opening to circulate said plurality of balls with respect to said helical passageway, a non-enclosed channel defined in said external ball nut return that extends between said first and second end openings.

2. The ball screw mechanism of claim 1 wherein said first end opening is further defined as being formed as a channel that opens oblique to said first axis.

3. The ball screw mechanism of claim 2 wherein said external ball nut return defines a substantially planar return path along which said plurality of balls move between said first and second ends.

4. The ball screw mechanism of claim 3 wherein said second end opening is further defined as being formed as a channel that opens oblique to said first axis.

5. The ball screw mechanism of claim 1 wherein said external ball nut return includes a substantially v-shaped bottom portion with first and second surface portions disposed transverse to one another for guiding movement of said plurality of balls circulating between said first and second openings such that each of said plurality of balls is disposed in two-point contact with said external ball nut return during movement between said first and second ends.

6. The ball screw mechanism of claim 5 wherein said external ball nut return defines a substantially planar return path along which said plurality of balls move between said first and second ends and wherein said v-shaped bottom portion extends over a length of said return path.

7. The ball screw mechanism of claim 5 wherein at least one of said first and second surface portions is oblique with respect to said first axis in a plane defining said first end opening.

8. The ball screw mechanism of claim 1 wherein said external ball nut return further comprises:
   an outer surface facing radially outwardly with respect to said first axis and extending between said first and second ends along a first path; and
   an inner surface for guiding movement of said plurality of balls circulating between said first and second openings and facing radially inwardly with respect to said first axis and extending between said first and second ends along a return path, wherein said first path and said return path are transverse with respect to one another.

9. The ball screw mechanism of claim 8 wherein a wall thickness between said inner and outer surfaces of said external ball nut return varies between said first and second ends.

10. The ball screw mechanism of claim 1 wherein said first end opening is further defined as being spaced from said first edge.

11. The ball screw mechanism of claim 10 wherein said first end opening is further defined as being radially outwardly spaced from said first edge relative to said first axis.

12. The ball screw mechanism of claim 11 wherein each of said plurality of balls moving out of said helical passageway moves along a first substantially arcuate path over said first edge and is received in said first end opening.

13. The ball screw mechanism of claim 12 wherein said plurality of balls move along a return path defined by said external ball nut return between said first and second ends and said first substantially arcuate path linking said return path and helical passageway.

14. The ball screw mechanism of claim 13 wherein said return path and said first substantially arcuate path are substantially co-planar.

15. The ball screw mechanism of claim 14 wherein each of said plurality of balls moving into said helical passageway moves along a second substantially arcuate path over said second edge from said second end opening, said first and second substantially arcuate paths being mirrored relative to one another on opposite sides of said return path.

16. The ball screw mechanism of claim 15 wherein said return path and said first substantially arcuate path and said second substantially arcuate path are substantially co-planar with one another.

17. The ball screw mechanism of claim 1 wherein said external ball nut return further comprises:
an inwardly facing inner surface having a bottom portion for guiding movement of said plurality of balls circulating between said first and second openings and extending between said first and second ends along a return path, wherein said return path is substantially arcuate such that any continuous linear section of said return path is one of less than and equal to a diameter of one of said plurality of balls.

18. The ball screw mechanism of claim 1 wherein said return path is substantially planar.

19. The ball screw mechanism of claim 1 wherein said external ball nut return is further defined as being plastic and being formable in a two piece mold.

20. The ball screw mechanism of claim 1 wherein said external ball nut return further comprises:
a first deflecting surface portion extending oblique to said first axis in a plane defining said first end opening.

21. The ball screw mechanism of claim 20 wherein said first deflecting surface portion is spaced from said at least one screw groove at said first opening to pinch an exiting ball of said plurality of balls against said at least one screw groove.

22. The ball screw mechanism of claim 21 wherein said cross-over return further comprises:
a second deflecting surface portion extending oblique to said first deflecting surface portion in a plane defining said first end opening.

23. The ball screw mechanism of claim 22 wherein said second deflecting surface portion is spaced from said at least one screw groove and from said first deflecting surface portion at said first opening to pinch the exiting ball of said plurality of balls against said at least one screw groove and against said first deflecting surface portion.

24. The ball screw mechanism of claim 23 wherein said first deflecting surface portion and said second deflecting surface portion and said at least one screw groove are further defined as being disposed relative to one another such that a first normal force acts on said exiting ball of said plurality of balls at said first deflecting surface portion and a second normal force acts on said exiting ball of said plurality of balls at said second deflecting surface portion and a third normal force acts on said exiting ball of said plurality of balls at said at least one screw groove, wherein said first normal force and second normal force are defined in a first plane and said third normal force is defined in second plane transverse to said first plane.

25. The ball screw mechanism of claim 24 wherein said external ball nut return defines a return path and wherein said first and second deflecting surface portions extend over a length of said return path.

26. The ball screw mechanism of claim 25 wherein said first and second deflecting surface portions are further defined as being integrally formed with one another.

27. The ball screw mechanism of claim 1 wherein said external ball nut return further comprises:
a first planar deflecting surface portion spaced from a center of said helical passageway greater than a radius of one of said plurality of balls in a plane defining said first end opening.

28. The ball screw mechanism of claim 1 wherein said external ball nut return is further defined as being resiliently deformed during engagement with said nut.

29. The ball screw mechanism of claim 1 wherein said external ball nut return includes a surface shaped as a channel opening toward said nut to define a return path along which said plurality of balls move between said first and second ends.

30. The ball screw mechanism of claim 29 wherein said return path extends between a surface of said nut and said surface along at least a portion of the return path.

31. The ball screw mechanism of claim 30 wherein balls moving along said return path are spaced from said surface of said nut, contacting only said surface of said external ball nut return.

* * * * *